US 6,999,448 B1

(12) United States Patent
Klein

(10) Patent No.: US 6,999,448 B1
(45) Date of Patent: Feb. 14, 2006

(54) INTERNET PROTOCOL STANDARDS-BASED MULTI-MEDIA MESSAGING

(75) Inventor: Robert M. Klein, Denver, CO (US)

(73) Assignee: Avaya Technology Corp., Basking Ridge, NJ (US)

(*) Notice: Subject to any disclaimer, the term of this patent is extended or adjusted under 35 U.S.C. 154(b) by 0 days.

(21) Appl. No.: 09/524,881

(22) Filed: Mar. 14, 2000

(51) Int. Cl.
*H04L 12/66* (2006.01)

(52) U.S. Cl. ............... 370/352; 370/401; 709/203; 379/88.17

(58) Field of Classification Search ........ 370/352–355, 370/389, 401, 409; 709/203; 379/88.17
See application file for complete search history.

(56) References Cited

U.S. PATENT DOCUMENTS

| 5,463,670 A | * | 10/1995 | Chiang et al. | ......... | 379/27.04 |
| 5,471,521 A | * | 11/1995 | Minakami et al. | ....... | 379/88.18 |
| 5,884,262 A | * | 3/1999 | Wise et al. | ............. | 704/270.1 |
| 6,122,255 A | * | 9/2000 | Bartholomew et al. | ..... | 370/237 |
| 6,188,688 B1 | * | 2/2001 | Buskirk, Jr. | ................. | 370/389 |
| 6,233,234 B1 | * | 5/2001 | Curry et al. | ................. | 370/356 |
| 6,269,336 B1 | * | 7/2001 | Ladd et al. | .................. | 704/270 |
| 6,320,857 B1 | * | 11/2001 | Tonnby et al. | ............. | 370/352 |
| 6,349,133 B1 | * | 2/2002 | Matthews et al. | ....... | 379/90.01 |
| 6,430,175 B1 | * | 8/2002 | Echols et al. | ............... | 370/352 |
| 6,434,528 B1 | * | 8/2002 | Sanders | .................... | 704/275 |
| 6,542,497 B1 | * | 4/2003 | Curry et al. | ................ | 370/352 |

FOREIGN PATENT DOCUMENTS

| EP | 0 847 179 A2 | 6/1998 |
| EP | 0921 659 A1 | 6/1999 |
| JP | 11163922 | 6/1999 |
| JP | 2000059441 | 2/2000 |
| WO | WO 98/48542 | 10/1998 |

OTHER PUBLICATIONS

Examiner's Office Letter, dated Feb. 17, 2005, for Japanese Patent Application No. 2001-71340.

* cited by examiner

*Primary Examiner*—Alpus H. Hsu
*Assistant Examiner*—Roberta Shand
(74) *Attorney, Agent, or Firm*—Sheridan Ross P.C.

(57) ABSTRACT

A method and apparatus for interfacing a communications server for use with a circuit based telephony system with an Internet protocol telephony system are provided. The present invention enables service providers to service both tip-ring telephony type communications and Internet protocol telephony type communications using a single communications server. In addition, the present invention enables existing tip-ring telephony type communications servers to be modified to support Internet telephony communications.

17 Claims, 7 Drawing Sheets

FIG. 2

| PORT NO. | TYPE |
|---|---|
| 0 | IP1 |
| 1 | IP2 |
| ⋮ | ⋮ |
| N-1 | TRK-1 |
| N | TRK |

INTERNET PROTOCOL STANDARDS-BASED MULTI-MEDIA MESSAGING

FIELD OF THE INVENTION

The present invention relates to telecommunications servers, including voice messaging servers.

BACKGROUND OF THE INVENTION

The telecommunications industry has developed a variety of servers, such as voice response servers, for use in connection with conventional tip-ring, circuit-based telephone systems. For example, voice messaging servers that present a prerecorded greeting to a caller when the telephone of a subscriber is not answered are in wide use. These voice messaging servers typically allow the caller to record an audio message for later retrieval by the subscriber. Existing voice messaging servers may also provide a variety of additional functions, such as the ability to contact an operator, or in connection with certain cellular telephones or paging systems, to page the subscriber. Other types of voice response servers include automated systems for interacting with callers to receive or distribute information. Most such voice response servers, including voice messaging servers, are adapted for use with traditional telephony techniques, which employ dedicated circuits for transmitting data between the calling telephone and the called telephone or voice response server.

In addition to conventional analog or digital telephone circuits, audible information can be transmitted over computer networks, such as the Internet. In general, computer networks divide data into data packets for transmission to the intended recipient over communications channels capable of simultaneously carrying data to many other recipients. The transmission of audible data in packets according to standards such as the Internet protocol (IP) telephony standards (e.g., H.323, H.245 and H.225), eliminates the need to provide a dedicated physical circuit between the endpoints of a communications link and is therefore more efficient than conventional telephony techniques. Accordingly, Internet telephony type systems are increasingly common.

In order to provide communications servers for use with Internet telephony type systems, vendors have developed servers compatible with such systems. However, such systems are typically not compatible with conventional tip-ring telephony systems. In addition, servers developed for use with Internet telephony systems are typically unable to re-use server hardware and software components previously developed for conventional telephony systems. Accordingly, communications servers for use with Internet telephony systems have limited applicability, and are expensive to develop.

Conventional communications servers for use in connection with Internet telephony do not allow for existing, circuit-based voice response servers to be adapted for use with Internet telephony. Therefore, although systems exist for providing communications servers for use in connection with Internet telephony, vendors must purchase entirely new servers. Additionally, communications servers have heretofore not been capable of operating in connection with both conventional tip-ring, circuit-based telephony and Internet-based telephony systems.

SUMMARY OF THE INVENTION

The present invention is directed to solving these and other problems and disadvantages of the prior art. Generally, according to the present invention, a communications server is interfaced with a computer network to enable the server to service telephone calls placed using an Internet telephony type communications channel. According to the present invention, the communications server is provided with a software module for mapping data events expressed using Internet protocol standards to corresponding events and the expression of such events in a traditional circuit-based communications system.

In particular, the present invention utilizes a communications server originally adapted for use with a tip-ring, circuit-based telephony network. According to the present invention, the communications server is provided with an interface for interconnecting the server to a computer network using a packet-based data communications protocol. In addition, the communications server is provided with a port interface for assigning ports on the server to virtual channels established over the computer network, and an Internet protocol process module that includes functions for translating between events expressed according to a tip-ring type telephony network, and commands transmitted according to a packet-based computer network.

According to an embodiment of the present invention, an existing server adapted for use with a tip-ring type telephony communications server may be modified so that it can service communications transmitted using a packet-based, or Internet protocol, computer network. In particular, an existing tip-ring server may be modified by replacing the server's existing port interface library with a port interface library as disclosed by the present invention, and by adding Internet protocol telephony software and hardware for interfacing the server to an Internet protocol network. Thus, the present invention allows the application software of an existing tip-ring server to operate in connection with an IP protocol telephony network by providing software that presents the application software with a consistent interface, regardless of whether a particular call being serviced is connected to the server at a tip-ring or IP network interface. In addition, according to the present invention, the ability of the server to service tip-ring type telephony communications may be maintained. Accordingly, the present invention enables service providers to upgrade their service offerings without needing to replace existing servers. In addition, the present invention provides communications servers capable of servicing communications transmitted over a tip-ring type telephony network and communications transmitted over a packet-based computer network simultaneously.

These and other advantages and features of the invention will become more apparent from the following description of an illustrative embodiment of the invention taken together with the drawings.

BRIEF DESCRIPTION OF THE DRAWINGS

FIG. 2 illustrates the contents of a port map according to an illustrative embodiment of the present invention;

DETAILED DESCRIPTION

Figure 1:
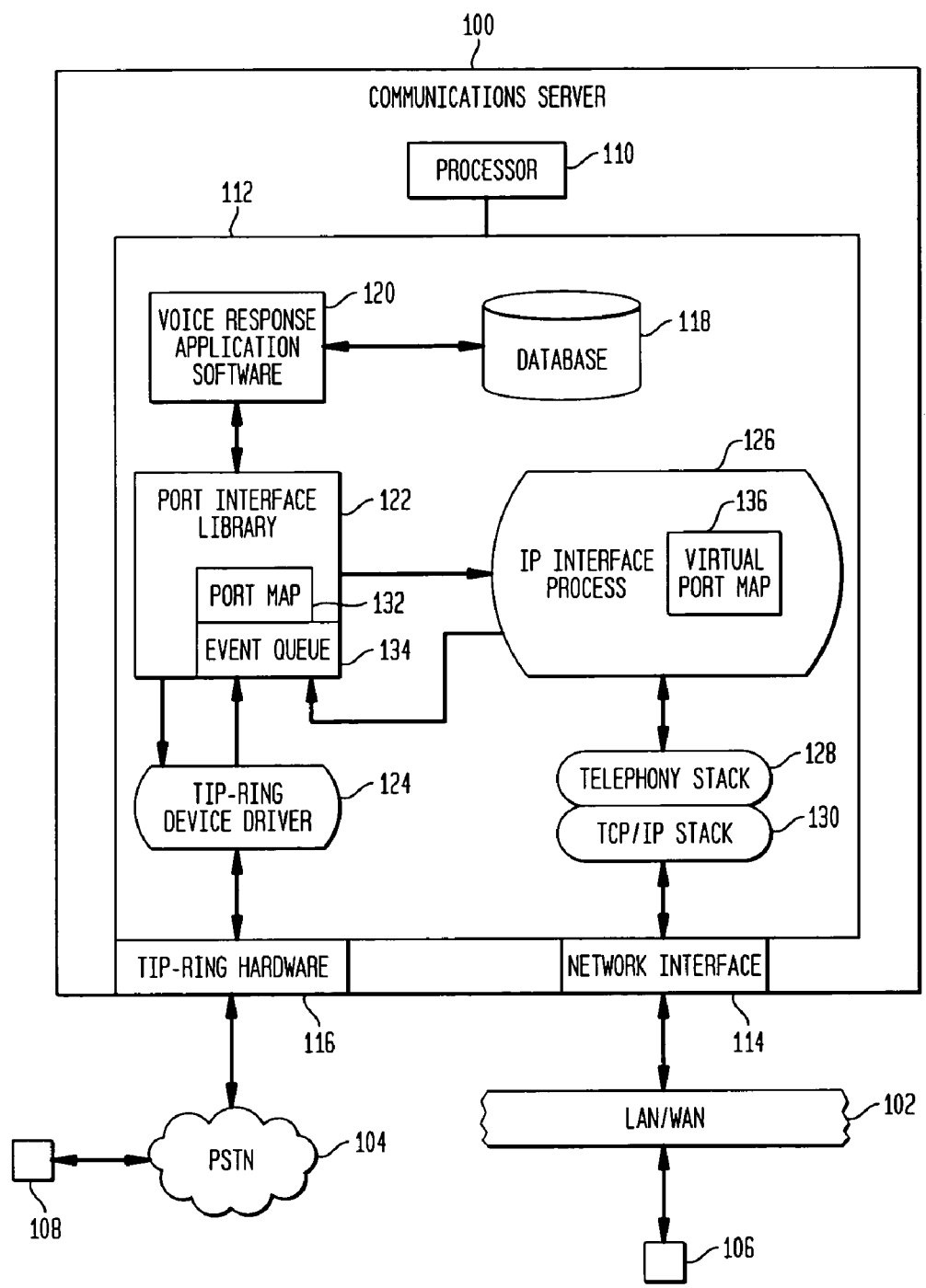
FIG. 1 is a block diagram of a communications server and surrounding system topology according to an embodiment of the present invention.

With reference now to FIG. 1, a communications server 100 is illustrated, including an illustrative system topology surrounding the communications server 100. The arrangement generally comprises the communications server 100, a computer network 102, and a continuous circuit-based telephony system 104.

The computer network 102 may be any local area network (LAN) or wide area network (WAN). For instance, the computer network 102 may be the public Internet or a private intranet. The computer network 102 is characterized by its use of data packets, arranged according to a defined protocol, for the delivery of communications across the network 102. The computer network 102 may be interconnected to a soft phone, audio enabled personal computer 106, or other type of endpoint, such as an Internet protocol (IP) end point. Accordingly, the computer network 102 may be used to transmit communications between the soft phone 106 and some other end point, such as a second soft phone (not shown in FIG. 1) or the communications server 100 according to Internet protocol telephony standards.

The tip-ring, continuous circuit telephone network 104 may be the public switched telephone network (PSTN). In addition, the tip-ring telephony system 104 may be a private branch exchange (PBX). As used herein, the tip-ring telephony system 104 may also comprise digital circuit based communications systems such as the T1 system. Accordingly, the interface between the tip-ring telephony system 104 and the communications server 100 employs switched circuit telephony standards. Interconnected to the tip-ring telephony system 104 may be a telephone 108 or other communications device. The communications device 108 may be a telephone that can be interconnected to the communications server 100 through the telephony system 104 using well known continuous circuit techniques. However, it should be understood that the telephone 108 may be interconnected to the communications server through any combination of communications systems.

The communications server 100 may be any telephony communications server, including voice response servers and messaging servers, such as the Intuity Audix™ or AnyPath™ messaging systems or Conversant™ voice response systems of Lucent Technologies Inc. The communications server 100 is generally a stored program controlled apparatus, having a processor 110 for executing control programs stored in storage 112. Storage 112 may be any computer readable storage medium. The communications server 100 also includes a network interface 114 for interconnecting the communications server 100 to the computer network 102. The communications server 100 may also be provided with tip-ring telephony ports 116 for interconnecting the communications server 100 to the tip-ring telephony network 104.

The storage 112 may contain a database 118 for storing administrative information. For example, where the communications server 100 is a messaging server, the database 118 may provide message mailboxes for each subscriber of the messaging service and for storing associated information, such as subscriber greetings and subscriber passwords. The storage 112 may also include a variety of software modules. For example, the storage 112 generally includes a voice response application software module 120 for controlling the interaction of the communications server 100 with users who establish communications with the server 100. For instance, where the communications server 100 is a messaging server, the application software 120 may provide an interface to subscribers and those persons attempting to contact the subscriber whose calls have been redirected to the server 100. In addition, the application software 120 may include the programming necessary to play back subscriber greetings, record caller messages, and otherwise provide the rich set of features associated with such servers 100. In general, the application software 120 is adapted to communicate with other software modules (described below) using a predetermined set of commands. This predetermined set of commands may be any type of interprocess message, such as a standard UNIX operating system IPC message queue type interprocess message.

The storage 112 also contains a port interface library 122, a tip-ring device driver 124, an Internet protocol (IP) interface process 126, an IP telephony stack 128, and a TCP/IP stack 130. The port interface library 122 may include a port map 132 and an event queue 134. Generally, the port map 132 maps the ports available on the voice response application software 120 to those handling communications transmitted over the tip-ring telephony system 104, and to those handling 132 communications transmitted over the computer network 102. The allocation of ports in the port map 132 to the tip-ring telephony system 104 or the computer network 102 may be determined by the administrator of the server 100, or may be performed dynamically according to demand. The event queue 134 serves as a buffer for asynchronous events received from the tip-ring device driver 124 or the IP interface process module 126.

The tip-ring device driver 124 contains the programming commands necessary to control the tip-ring interface hardware 116. The tip-ring device driver 124, in response to events received from the port interface library 122 that are formatted according to the predetermined set of commands, controls the tip-ring interface hardware 116 in accordance with those events. The tip-ring interface hardware also formats data passed to it from the port interface library 122 for transmission across the tip-ring telephony system 104. In addition, the tip-ring device driver 124 operates to receive data and events from the tip-ring telephony system 104 and to format data and events according to the predetermined set of commands and pass the formatted data and events to the port interface library 122. Accordingly, it can be appreciated that the tip-ring device driver 124 serves to control the tip-ring hardware 116, and that commands and data that pass between the tip-ring device driver 126 and the port interface library 122 are formatted according to the conventions of the predetermined set of commands.

The IP interface process 126 generally serves as an interface and a translation module to translate between the port interface library 122 and the IP telephony stack 128 associated with the network interface 114. Thus, the IP interface process 126 communicates with the application software 120 using the application software's 120 predetermined set of commands, and with the IP telephony stack 128 using packets of data, as required by the IP telephony stack 128. The network interface 114 serves as the physical interface between the computer network 102 and the TCP/IP stack 130. Data packets received at the TCP/IP stack 130 are passed to the IP telephony stack 128. The IP telephony stack 128 may be any protocol for the transmission of voice, fax and data communications over computer networks, including the Internet, such as the H.323, H.245 and H.225 standards established by the International Telecommunications Union. The IP telephony stack 128 then provides the data, still in the form of packets, to the IP interface process 126.

In general, communication streams transmitted over the computer network 102 are not assigned to dedicated physical circuits. Instead, data associated with each stream is placed into packets for transmission over a shared communication channel. Because of the lack of dedicated circuits in the computer network 102 environment, individual communication streams must be assigned to virtual ports. A virtual port map 136 is therefore included as part of the Internet protocol interface process 126, to enable the IP interface process module 126 to attribute particular communication streams to particular ports in communicating with the port interface library 122. In view of the above discussion, it can be understood that communications transmitted over the computer network 102 and handled by the IP interface process module 126 are in a data packet-type format.

Figure 2:
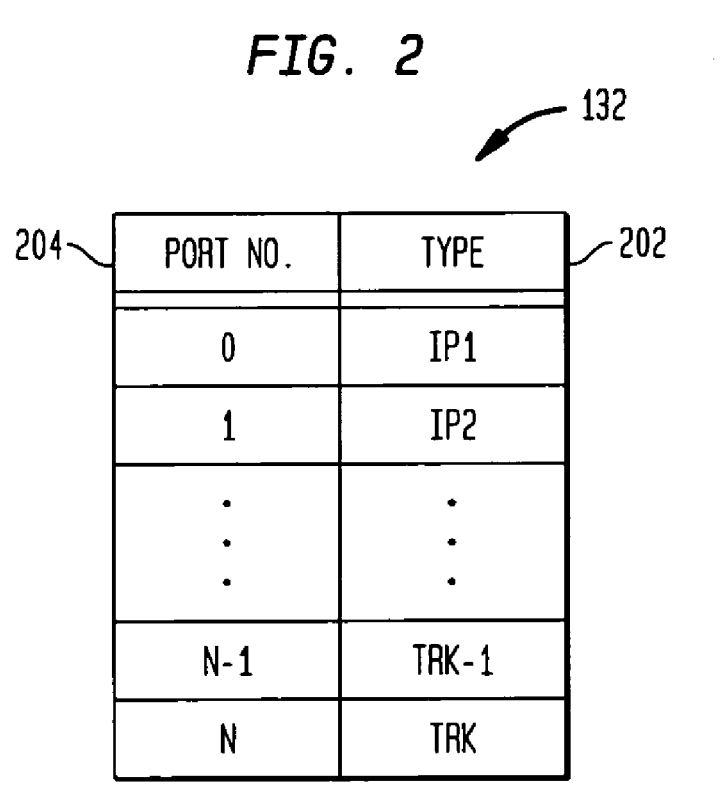

Referring now to FIG. 2, the contents of a port map 132 according to an illustrative embodiment of the present invention are illustrated. The port map 132 generally contains information regarding the type of communication channel 202 associated with each port available in connection with the voice response application software 120. In the example illustrated in FIG. 2, port numbers 0 and 1 are both associated with Internet protocol communications. Therefore, data and events originating from the voice response application software 120 in connection with ports 0 and 1 will be forwarded by the port interface library 122 to the IP interface process module 126. Port numbers n–1 and n are, in the example illustrated in FIG. 2, associated with the tip-ring telephony system 104. Therefore, events and data originating from the voice response application software 120 in connection with ports n–1 and n will be forwarded by the port interface library 122 to the tip-ring device driver 124 for transmission across the tip-ring telephony system 104. Commands and data received by the IP interface process module 126 from the computer network 102 are associated with the appropriate port number, and translated into the predetermined set of commands used by the voice response application software 120 to communicate with other software modules before being passed to the port interface library 122. Commands and data received by the tip-ring device driver 124 from the tip-ring telephony network 104 are also formatted before they are passed to the appropriate port on the voice response application software 120.

Figure 3:
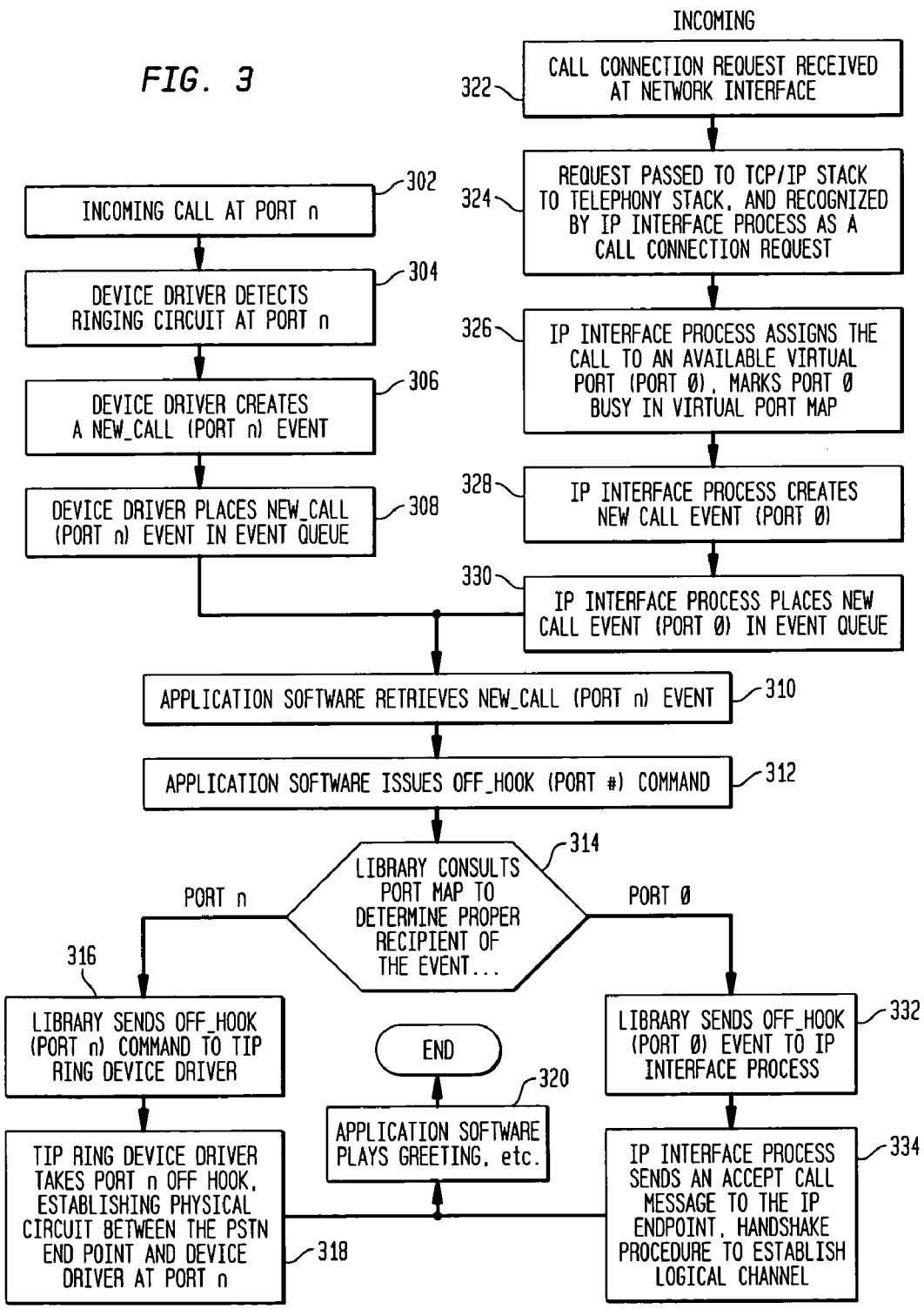
FIG. 3 is a flow chart illustrating the operation of a server in accordance with an embodiment of the present invention in response to an incoming telephone call.

The operation of the communication server 100, according to an embodiment of the present invention, will now be illustrated in the context of various examples. With reference now to FIG. 3, a flow chart of the operation of the server 100 in answering a telephone call is shown. Initially, an example of the operation of the server 100 in response to an incoming call received at port n of the tip-ring hardware 116 (step 302) will be explained. Then, the operation of the server 100 in response to an incoming call received at the network interface 114 will be explained. When a call is received on a tip-ring port, for example port n, the tip-ring device driver 124, at step 304, detects the ringing circuit at port n. The device driver 124, in response to the ringing circuit, creates a NEW_CALL(port n) event at step 306, which is placed in the event queue 134 of the port interface library 122 at step 308. The new call event is received by the voice response application software 120 via a GET_EVENT( ) function call initiated by the application software 120 at step 310. In response to the new call event, the application software 120 issues an OFF_HOOK(port n) command to the port interface library 122 to place port n off hook at step 312. At step 314, the port interface library 122 consults the port map 132 to determine the type of interface associated with port n. In the present example, port n is a tip-ring port, therefore, the port interface library 122 directs the OFF_HOOK(port n) command to the tip-ring device driver 124 to place port n (step 316) off hook. At step 318, the tip-ring device driver 124 takes port n off hook, establishing a physical circuit between the telephony system 104 end point (e.g., telephone 108) and the device driver of the tip-ring hardware 116 for port n. The application software 120 may then begin its normal call-answer scenario at step 320, such as playing a greeting and allowing the calling party to record a message in a subscriber mailbox, etc.

With continued reference to FIG. 3, the operation of an embodiment of the server 100 in response to a connection request received from an Internet protocol endpoint 106 will now be explained. At step 322, a call connection request is received at the network interface 114 as a packet of data. The call connection request is passed to the TCP/IP stack 130 to the Internet protocol telephony stack 128, and is then delivered to the Internet protocol interface process 126 (step 324). The IP interface process 126 recognizes the data packet to be a call connection request, assigns the incoming call to an available virtual port at step 326, and updates the virtual port map 136 to indicate that the assigned port is busy. Where, for example, port 0 is available, the IP interface process 126 may assign the call to port 0, and mark port 0 as busy in the virtual port map 136. At step 328, the IP interface process 126 creates a NEW_CALL(port 0) event, and places the new call event in the event queue 134 of the port interface library 122 at step 330. The application software 120 retrieves the new call event via a GET_EVENT( ) function call at step 310. The application software 120 then issues an OFF_HOOK(port 0) command to place port 0 off hook at step 312. Upon receipt of the command to place port 0 off hook, the port interface library 122 consults the port map 132 at step 314 to determine whether port 0 is a tip-ring or IP telephony type port. In the present example, port 0 is an IP telephony port, therefore, the port interface library 122 directs the OFF_HOOK(port 0) command to the Internet protocol interface process 126 to place port 0 off hook at step 332. The IP interface process 126, upon receipt of the off hook command, sends an accept call message to the Internet protocol endpoint 106 at step 334. The Internet protocol interface 126 then exchanges connection information with the IP endpoint 106 (i.e. completes handshake procedures) and establishes a logical channel and a remote transfer protocol (RTP) session, also at step 334.

From the examples discussed with respect to FIG. 3, it can be appreciated that the server 100 of the present invention is capable of servicing connections established over either the PSTN 104 or the computer network 102. Furthermore, it can be appreciated that the voice response application software 120 is the same, regardless of whether the communication channel used is the PSTN 104 or a computer network 102.

Figure 4:
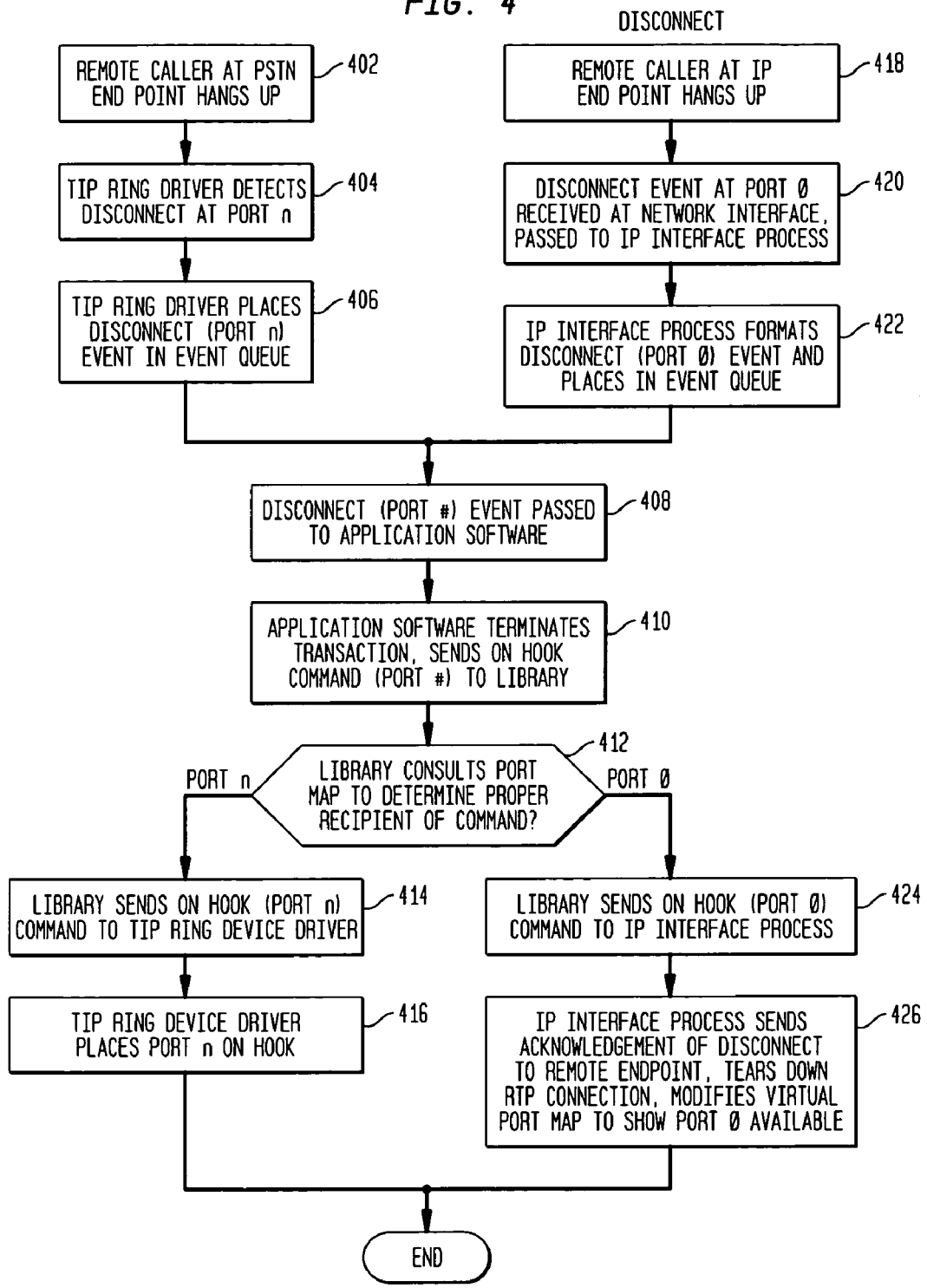
FIG. 4 is a flow chart illustrating the operation of a server in accordance with an embodiment of the present invention in response to a disconnect signal from a remote endpoint.

With reference to FIG. 4, a flow chart of the operation of the server 100 in disconnecting from established telephone calls is shown. Initially, the operation of the server 100 in response to a disconnect event initiated by a remote caller connected to the server 100 over the PSTN 104 will be explained. At step 402, the remote caller initiates a disconnect by hanging up the telephone 108. At step 404, the tip-ring driver 124 detects the disconnect signal at port n. In response to the disconnect signal, the tip-ring driver 124 places a DISCONNECT(port n) event in the event queue 134 of the port interface library 122 (step 406). The DISCONNECT(port n) event is then passed to the application software 120 via a GET_EVENT( ) function call initiated by the application software 120 at step 408. In response to the DISCONNECT(port n) event, the application software 120 terminates the transaction, and sends an ON_HOOK(port n) command to the port interface library 122 at step 410. At step 412, the library 122 consults the port map 132 to determine how to route the ON_HOOK(port n) command. Here, port n is associated with a tip-ring port, therefore the library 122 sends the ON_HOOK(port n) command to the tip-ring device driver 124 at step 414. In response to the ON_HOOK(port n) command, the tip-ring device driver 124 places port n on hook at step 416, concluding the disconnect operation.

With continued reference to FIG. 4, the operation of the system 100 in response to a disconnect event received from a remote caller communicating with the server 100 over the computer network 102 will now be illustrated. At step 418, the remote caller at the Internet protocol endpoint 106 hangs up. As can be appreciated, the remote caller may "hang up" the end point 106 by, for example, clicking on a button presented by a graphical user interface of a communication program associated with a personal computer or other device. At step 420, a data packet containing a disconnect event for port 0 is received at the network interface 114, and is passed to the IP interface process 126. The IP interface process 126 reads the received packet of data, and in response formats a DISCONNECT(port 0) event and places that event in the event queue 134 at step 422. The voice response application software 120 retrieves the DISCONNECT(port 0) event from the event queue 134 through a GET_EVENT( ) function call at step 408. In response to the DISCONNECT(port 0) event, the application software 120 terminates the transaction for port 0 and sends an ON_HOOK(port 0) command to the port interface library 122 at step 410. The library then consults the port map to determine the proper recipient of the event at step 412. Because port 0 is associated with a communication channel established over the computer network 102, the ON_HOOK (port 0) command is sent to the IP interface process 126 at step 424. In response to the ON_HOOK(port 0) command, the IP interface process 126 sends acknowledgment of the disconnect to the remote end point 106, tears down the remote transfer process (RTP) connection, and modifies the virtual port map 136 to show port 0 available at step 426, completing the disconnect sequence.

From the description of the response of the server 100 to disconnect events initiated by a "hang up" signal from a caller at a remote telephone 108 or IP end point 106, it can be seen that the process steps concerning the functions of the core voice response application software 120 are the same, regardless of the communication channel. Accordingly, the server 100 of the present invention allows existing voice response application software 120 to be used in connection with either communications taking place over the PSTN 104, or those transmitted across a computer network 102 such as the Internet.

Figure 5:
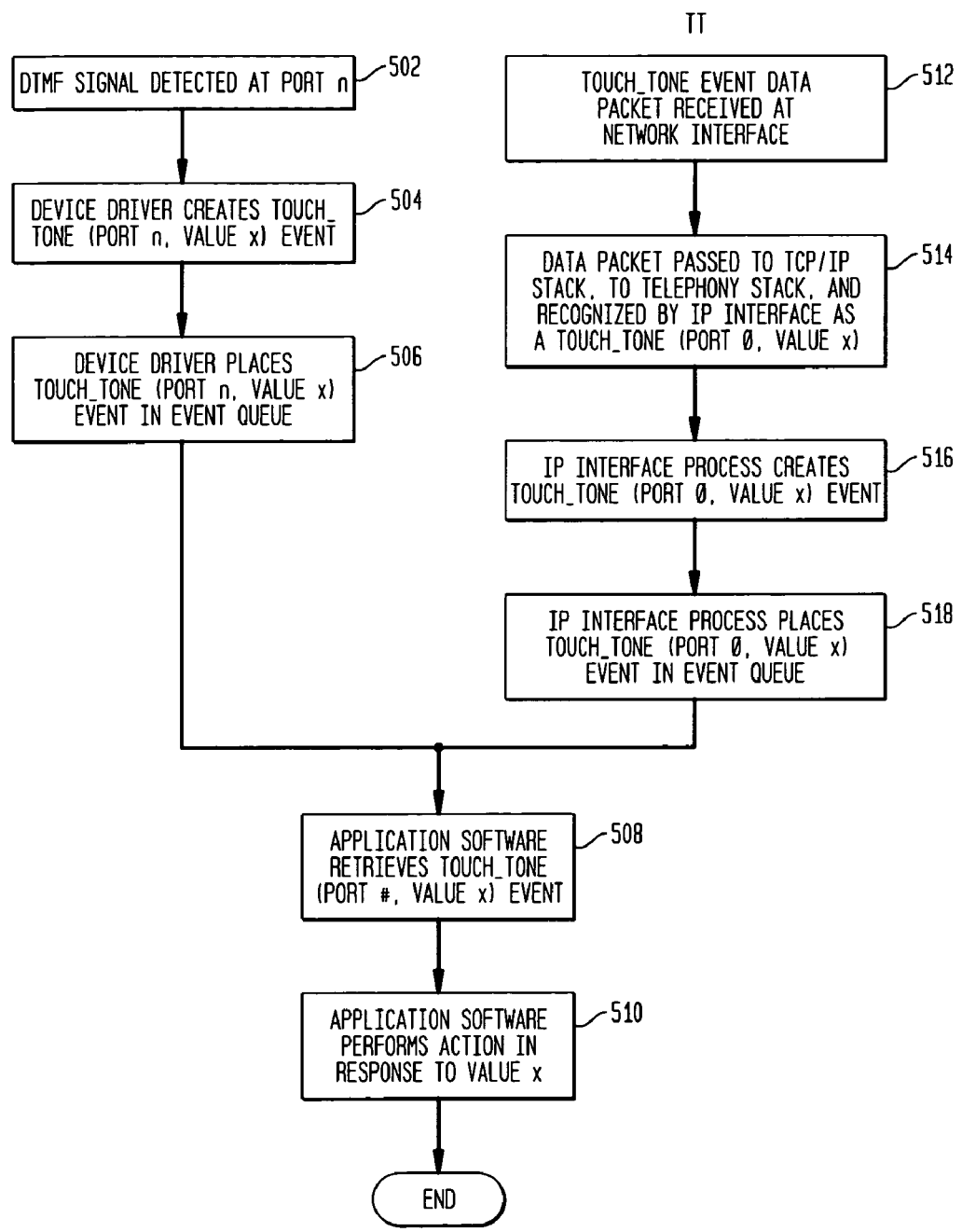
FIG. 5 is a flow chart illustrating the operation of a server in accordance with an embodiment of the present invention in response to the receipt of a touch tone event.

With reference now to FIG. 5, the operation of the server 100 in response to receipt of a touch tone event according to an embodiment of the present invention, will now be illustrated. At step 502, the server 100 detects a dual tone multiple frequency (DTMF) signal at port n of the tip-ring hardware 116. The device driver 124 formats a TOUCH_TONE(port n, value x) event at step 504, where the value x is related to the key pressed on the keypad of the telephone 108 (e.g., 1, 2, 3, 4, 5, 6, 7, 8, 9, 0, * or #). The device driver 116 then places the TOUCH_TONE(port n, value x) event in the event queue 134 of the port interface library 122 at step 506. At step 508, the application software 120 retrieves the TOUCH_TONE(port n, value x) event through a GET_EVENT( ) function call made to the event queue 134. The application software 120 then performs a prescribed action in response to receipt of the value x at step 510. For example, the application software 120 may connect the caller to an operator upon receipt of a touch tone value for zero.

Where a touch tone is entered by a caller connected to the server 100 via the computer network 102, the touch tone event is received as a data packet at the network interface 114 (step 512). As with any other type of data packet received at the network interface 114, the touch tone event data packet is passed to the TCP/IP stack 130, to the IP telephony stack 128, and finally to the IP interface process 126 at step 514. Also at step 514, the IP interface process 126 recognizes the data packet as a touch tone event at a port, for example, port 0. As can be appreciated by those of ordinary skill in the art, the touch tone event may be communicated to the IP interface process 126 using an in-band (for example, DTMF tone data embedded in the RTP audio stream) or out of band signal (for example, an H.245 protocol user input indication message). At step 516, the IP interface process 126 creates a TOUCH_TONE(port 0, value x) event. The IP interface process 126 places the TOUCH_TONE(port 0, value x) event in the event queue 124 at step 518. The application software 120 then retrieves the TOUCH_TONE(port 0, value x) event through a GET_EVENT( ) function call at step 508. The application software may then perform an action in response to the value x received at step 510.

From the examples given above in connection with FIG. 5, it can be appreciated that the TOUCH_TONE(port #, value x) event, apart from the port number with which the event is associated, appears the same to the application software 120, regardless of the communication channel over which the server 100 received the event or command. Accordingly, the application software 120 need not be modified in order to operate in connection with a computer network 102. All that is required is that the server 100 be provided with a port map 132, an IP interface process 126, and an associated Internet protocol device drivers and hardware.

Figure 6:
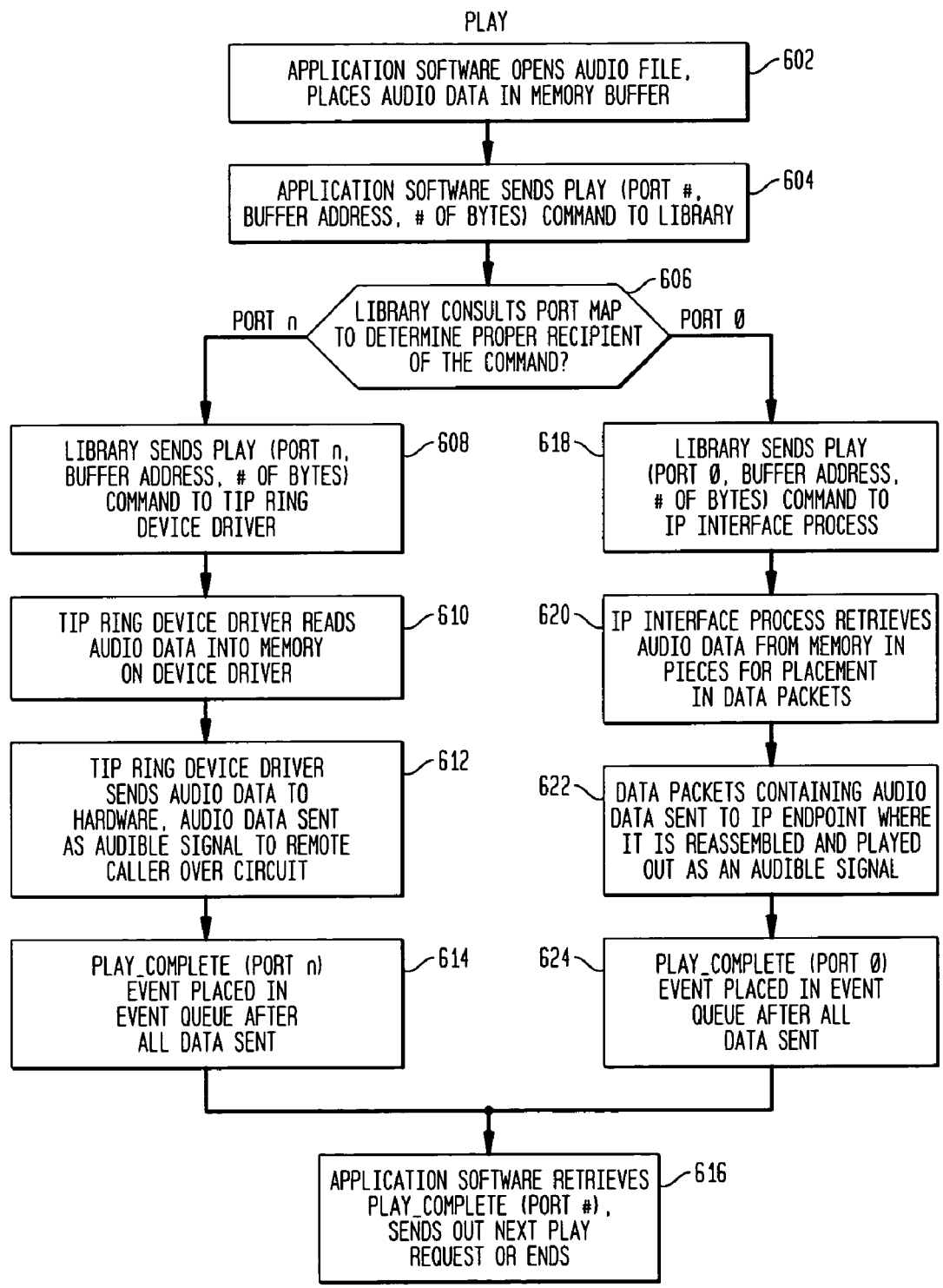
FIG. 6 is a flow chart illustrating the operation of a server in accordance with an embodiment of the present invention in playing audible signals to a caller (play event)

With reference now to FIG. 6, the operation of a server 100 in playing audio signals to a remote caller is illustrated. Initially, at step 602, the application software 120 opens an audio file stored on database 118, and places the audio data contained in that file in a memory buffer. The application software 120 next sends a PLAY(port #, buffer address, number of bytes) command to the library 122 at step 604. These steps are taken by the application software 120 regardless of whether the port with which the play command is associated is a tip-ring or IP telephony port. Indeed, the port type is transparent to the application software 120. At step 606, the library 122 consults the port map 132 to determine the proper routing for the play command. Where, for example, the play command is associated with port n, and port n is assigned by the virtual port map 132 to a physical tip-ring port, the play command will be routed to the tip-ring device driver 124 (step 608). The tip-ring device driver 124 reads the audio data at the buffer address specified as part of the play command into memory associated with the tip-ring hardware 116 at step 610. The tip-ring hardware 116 then sends the audio data to the tip-ring device driver 124, and the audio data is sent as an audible signal to the remote caller over the physical tip-ring circuit established across the PSTN 104 (step 612). At step 614, following play of all of the data contained at the specified buffer address, the tip-ring device driver 124 places a PLAY_COMPLETE(port n) event in the event queue 134. At step 616, the application software 120 retrieves the PLAY_COMPLETE(port n) event through a GET_EVENT( ) function call and sends the next play request to the library 122, or terminates the play sequence.

The steps taken by the application software 120 to initiate play of an audio message are the same where the message is to be transmitted over the computer network 102. Thus, at step 602, the application software 120 opens an audio file, and places audio data from that file in a memory buffer. At step 604, the application software sends the play command to the library 122. The play command here references an IP telephony port. Thus, for example, the command is PLAY (port 0, buffer address, number of bytes). The library 122 consults the port map 132 at step 606 to determine the proper recipient of the play event. Here, port 0 is an IP telephony port, thus the library sends the PLAY(port 0, buffer address, number of bytes) command to the IP interface process 126 at step 618.

The IP interface process 126 retrieves the audio data from the memory buffer and places that data in data packets for transmission to the remote IP endpoint 106 (step 620). At step 622, the data packets containing the audio data are sent to the IP end point 106 using RTP/RTCP standard communication protocol, where the data is reassembled and played out as an audible signal to the caller. After all of the data packets have been sent to the IP endpoint 106, the IP interface process 126 issues a PLAY_COMPLETE(port 0) event, and places that event in the event queue 134 (step 624). The application software 120 then retrieves the PLAY_COMPLETE(port 0) event through a GET_EVENT( ) function call, and sends out the next play request or terminates the play sequence at step 616.

Figure 7:
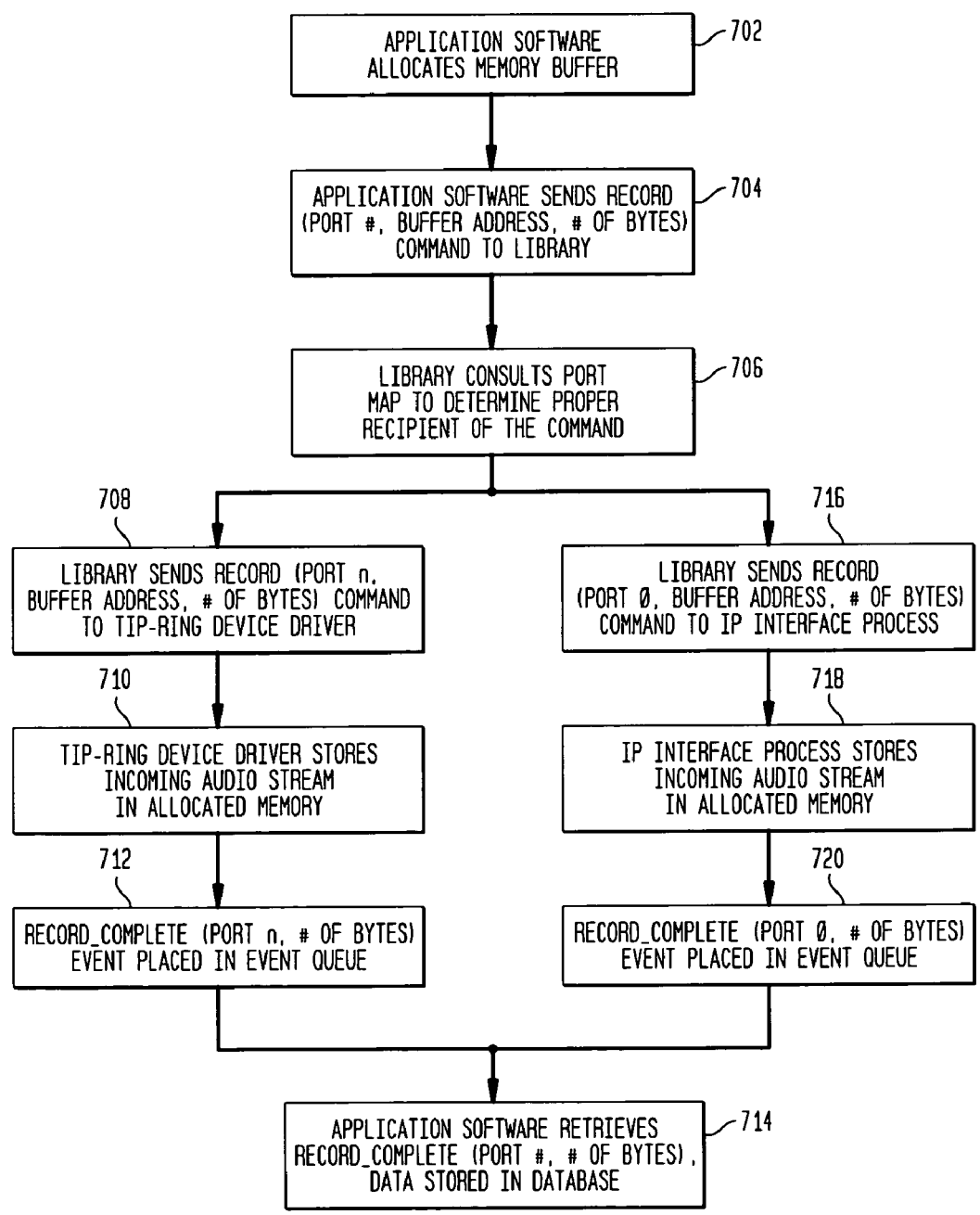
FIG. 7 is a flow chart illustrating the operation of a server in accordance with an embodiment of the present invention in recording audible signals from a caller (record event).

With reference now to FIG. 7, the operation of a server 100 in accordance with an embodiment of the present invention, in response to the command to record audio signal from a caller is illustrated. At step 702, the application software 120 allocates a memory buffer to receive the audio data. The application software 120 then sends a RECORD (port #, buffer address, number of bytes)command to the library 122 at step 704. These steps are taken by the application software without regard to whether the audio data will be recorded from a tip-ring or IP telephony port. The library 122 consults the port map 132 to determine where the record event should be routed at step 706. Where, for example, the record command is associated with port n, and port n is assigned by the virtual port map 132 to a physical tip-ring port, the record command will be routed to the tip-ring device driver 124 (step 708). The tip-ring device driver 124 then stores the incoming audio stream from the tip-ring hardware 116 in the allocated memory buffer until the buffer is full or the application software 120 instructs the tip-ring device driver to stop recording (step 710). After the record process has terminated, the tip-ring device driver 124 returns a RECORD_COMPLETE(port n, #bytes) event to the event queue 134 at step 712. The application software 120 then retrieves the RECORD_COMPLETE (port n, # bytes) event through a GET_EVENT( ) function call and stores the audio data in the database 118 (step 714).

The steps taken by the application software 120 to record incoming audio data are the same where the audio data is received at the network interface 114. Accordingly, at step 702 the application software 120 allocates a memory buffer to receive the audio data. At step 704, the application software 120 sends a RECORD(port 0, buffer address, # bytes) command (e.g. where port 0 is allocated to an IP telephony port) to the library 122. The library 122 then consults the port map 132 to determine where the command should be routed at step 706. In the present example, port 0 is an IP telephony port, so the command is directed to the interface process 126 (step 716). The IP interface process 126 stores the incoming audio stream in the allocated memory buffer until the buffer is full or the IP interface process 126 is instructed to otherwise stop recording data (step 718). The IP interface process 126 next returns a RECORD_COMPLETE(port 0, # bytes) event to the event queue (step 720). The application software 120 retrieves the RECORD_COMPLETE (port 0, # bytes) event through a GET_EVENT( ) function call and stores the audio data in the database 118 at step 714.

From the examples given above with respect to FIG. 7, it can be seen that the operations taken by the application software 120 are identical, regardless of whether the audio data was received by the server 100 from the PSTN 104 or the computer network 102. The only difference is the port number associated with the stored audio data. Accordingly, a server 100 according to the present invention may use preexisting application software 120 in connection with communications transmitted over a computer network 102, such as the Internet.

Of course, various modifications to the method and apparatus of the present invention described above can be contemplated. For instance, the communications server 100 need not be connected to a tip-ring telephony system 104. Such variations can be made without departing from the spirit and the scope of the invention and without diminishing its attendant advantages, and it is intended that such variations be covered by the appended claims.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A communications apparatus, comprising:
   a communications server operable to service physical circuits established over a continuous circuit telephony system, said communications server including:
   an interface operable to interconnect said server to a continuous circuit telephony system;

a computer network interface operable to interconnect said server to a computer network;

a voice response application module operable to provide communications services;

a port interface library module in communication with said voice response application module and operable to assign a server port to a virtual communications channel established over said computer network, wherein a first server port is assigned to a virtual channel established over said computer network, and wherein a second server port is assigned to a channel established over said continuous circuit telephony system;

an Internet protocol interface process module interconnected to said computer network interface and to said port interface library module, wherein said Internet protocol interface process module communicates with said port interface library module using a first set of commands expressed in a non-packet based format, wherein said first set of commands in a non-packet based format includes commands to reproduce voice data provided by said voice response application module, wherein said Internet protocol interface process module communicates with said computer network interface using a second set of commands expressed in a packet-based format, and wherein said second set of commands expressed in a packet-based format includes commands to reproduce voice data provided by said voice response application module; and a continuous circuit telephone system device driver interconnected to said continuous circuit telephony system interface and to said not interface library module, wherein said continuous circuit telephony system interface communicates with said port interface library module using said first set of commands.

2. The apparatus of claim 1, wherein said interface for interconnecting said server to a continuous circuit telephony system is a tip-ring telephony interface.

3. The apparatus of claim 1, wherein said server is a voice response server.

4. The apparatus of claim 1, wherein said server is a unified communications server.

5. The apparatus of claim 1, wherein said server is a unified messaging server.

6. The apparatus of claim 1, wherein said computer network is the Internet.

7. The apparatus of claim 1, wherein said continuous circuit telephony system is the public switched telephony network.

8. The apparatus of claim 1, wherein said continuous circuit telephony system is a private branch exchange.

9. An internet protocol voice response system, comprising:

a communications server adapted for use with a tip-ring telephony system;

means for operatively connecting said communications server to a tip-ring telephony network;

means for operatively connecting said communications server to an Internet protocol computer network;

means for translating between tip-ring telephony system events and Internet protocol telephony commands, wherein said means for translating serves to operably connect said communications server to said Internet protocol computer network; and means for allocating at least some of a number of channels available on said communications server for communications channels established over said tip-ring network to virtual communications channels established over said Internet protocol computer network;

a tip-ring telephony network, wherein said means for allocating channels available on said communications server allocates said channels between virtual communications channels established over said Internet protocol computer network and physical channels established over said tip-ring telephony network, wherein a first channel available on said communications server is assigned to a virtual channel established over said Internet protocol computer network, and wherein a second channel available on said communications server is assigned to a channel established over said tip-ring network.

10. The system of claim 9, wherein said Internet protocol computer network is the Internet.

11. The system of claim 9, wherein said tip-ring telephony network is the public switched telephony network.

12. The system of claim 9, wherein said tip-ring telephony network is a private branch exchange.

13. A method for interfacing a tip-ring telephony server to a packet-based communications network, comprising:

receiving a first signal at an interface between a tip-ring telephony server and a computer network, wherein said first signal is in a first signal format comprising a first one of a packet of data and a software event;

translating said first signal into a second signal format, wherein said second signal format comprises a second one of a packet of data and a software event; and performing at least one of the following steps:

a) providing said first signal formatted as a software event, to said tip-ring telephony server when said computer network is the source of said first signal, and b) providing said first signal, formatted as a packet of data, to said computer network when said tip-ring telephony server is the source of said first signal;

assigning channels available on said tip-ring telephony server to virtual channels established over said packet-based network;

receiving a second signal at an interface between said tip-ring telephony server and a tip-ring telephony network, wherein a first channel available on said tip-ring telephony server is assigned to a first virtual channel established over said packet-based network, and wherein a second channel available on said tip-ring telephony server is assigned to a second channel established over said tip-ring telephony network.

14. The method of claim 13, further comprising:

interfacing said server with a tip-ring telephony network; and allocating channels available on said server between virtual channels established over said packet-based network and physical channels established over said tip-ring telephony network.

15. The method of claim 13, wherein said packet-based network is the Internet.

16. The method of claim 14, wherein said tip-ring telephony network is the public switched telephony network.

17. The method of claim 15, wherein said tip-ring telephony network is a private branch exchange.

* * * * *